Feb. 9, 1943.   H. TREVASKIS   2,310,884
CHUTE FOR AMMUNITION AND OTHER ARTICLES
Filed Sept. 2, 1942
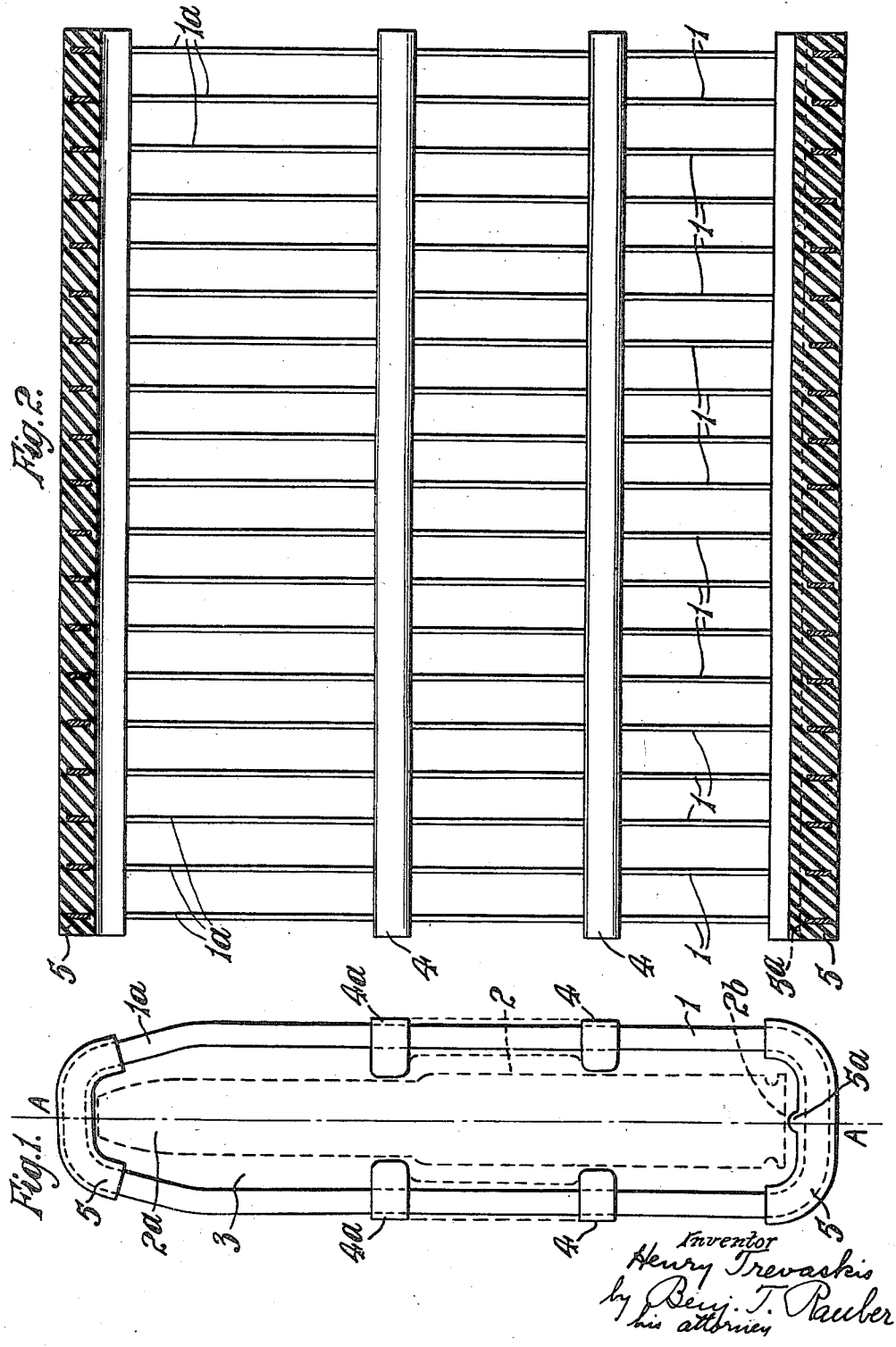

Patented Feb. 9, 1943

2,310,884

UNITED STATES PATENT OFFICE 2,310,884

CHUTE FOR AMMUNITION AND OTHER ARTICLES

Henry Trevaskis, Hampton Lane, Solihull, England, assignor to Dunlop Rubber Company Limited, London County, England, a British company Application September 2, 1942, Serial No. 457,007
In Great Britain April 18, 1941

4 Claims. (Cl. 89—33)

My invention relates to improvements in chutes for feeding or conveying ammunition, such as a succession or belt of cartridges or shells to machine guns, or for conveying in like manner other series of articles or bodies.

Chutes for ammunition must provide a passage-way or path that is substantially smooth in a longitudinal direction and of substantially uniform cross-section. Also it is generally necessary that such passage-way or path must be capable of being turned or bent or twisted without substantially distorting its cross-sectional area-way or interrupting the smoothness of its guiding surfaces.

In my invention I provide a flexible chute wherein the guiding surfaces are capable of turning sharply while being held in a substantially unvarying cross-sectional arrangement.

In my invention lengths of rubber or similar elastic flexible material extend longitudinally in spaced relation to form guiding surfaces for the ammunition and are held in spaced position by means of a series of approximately aligned frames spaced in successively spaced planes transverse to or intersecting the lengths of rubber. These frames may be of any suitable shape, but preferably enclose an elongated opening somewhat larger in area than the ammunition and generally roughly conforming in shape thereto.

When the chute is straight these frames will be in parallel spaced planes and embedded in, or secured to, the lengths of rubber which will project into the passage-way formed by the succession of frames to form continuous guiding and supporting surfaces for the ammunition.

The rubber being flexible and resilient may, however, turn or be twisted with a slight displacement of the frame from parallelism or from exact alignment. However, inasmuch as the frames are closely spaced the relative displacement of one to the next is very slight and results in no appreciable distortion of the position of the guiding surfaces formed by the lengths of rubber.

The frames may consist of any suitable material of sufficient rigidity. They may, for example, be stamped from sheet or strip metal of suitable gauge. Also other compositions of similar characteristics may be substituted for rubber for the guides.

Various features of the invention as illustrated, by way of example, in the accompanying drawing in which Fig. 1 is an end view of the chute constructed according to the invention; Fig. 2 is a sectional plan view on the line A—A of Fig. 1.

Referring to the drawing the improved chute comprises a plurality of thin frames 1 formed from flat strip metal of uniform gauge.

All the frames are of the same shape consisting of two longer parallel sides normally occupying a horizontal position, and merging into ends or into shorter sides 1a forming closed ends having rounded corners.

The vertical depth between the longer parallel sides may be uniform as shown in the drawing or may diminish towards one end of each frame to conform to the shape of the ammunition 2 shown in dotted lines in Fig. 1.

The frames are positioned side by side in spaced relation and in parallel planes with their central openings in register with one another, thus forming a central hollow passageway 3 for the ammunition or other bodies.

The frames are joined together transversely by continuous lengths of rubber strip 4 and 5 which may be mounted in position and spaced apart along the opposite sides of said frames.

The rubber strips 4 joining the central portions of the longer sides together, are formed to constitute continuous projections or ribs projecting into the passageway 3 towards each other from opposite sides thus serving to locate the shells 2 as they pass through the frames, and is preferably formed of hard vulcanized rubber having good adhersion to the frames 1.

For conveying ammunition of the kind shown comprising a projectile portion 2a of less external diameter than the cartridge case attached to the projectile portion, two of the strips 4a may project inwardly to a less extent than those at 4 which support the cartridge case. The respective strips 4 and 4a may be formed as one wide strip if preferred as shown by dotted lines in Fig. 1.

The rubber strips 5 joining and covering portions of the shorter sides of the frames are preferably more softly vulcanised and are embedded during moulding in the rubber strips at uniform or other intervals as required, as shown in Fig. 2.

The rubber strips 5 may be shaped to enclose the curved corners of the frames, the inside face of the strips at the wider end of the frames being formed with a projecting central rib 5a of part circular cross-section serving to guide the bases 2b of the cartridge portions, the narrower and tapered ends of the frames being similarly covered to guide and locate the noses 2a of the projectile portions of the ammunition.

The rubber strips 4, 4a, 5, 5a, may be treated to assist free sliding of the ammunition through the chute as, for example, by incorporating a lubricant such as graphite in the rubber mix from which the strips are moulded.

The improved chute construction described above enables considerable twisting to take place without materially altering the cross-sectional shape of the chute which can be very readily bent along its length and across its width.

For example where the frames are spaced one quarter of an inch apart and the total length of the chute is forty inches, one end of the latter may be twisted through ninety degrees in relation to the other end, with a resultant relative angular displacement of slightly more than half a degree between adjacent frames.

The chute may also be very readily bent along its length and the radius at the inside of such a bend may be as small as five or six inches.

Thus a very efficient feed may be obtained between the ammunition box and the gun despite any misalignment between them, since the internal shape of the chute is substantially maintained throughout its length irrespective of the twisting imparted thereto.

Having described my invention, I claim:

1. A flexible chute comprising a series of metal frames in approximately parallel spaced planes and in approximate alignment, said frames comprising two longer sides connected at their opposite ends and lengths of rubber extending longitudinally of said series and secured to said frames at the ends thereof and a pair of lengths of rubber of greater hardness secured to the longer side of said frames between the ends thereof to form continuous guiding surfaces for ammunition passing through said series of frames.

2. The chute of claim 1 having a second pair of lengths of rubber secured to said longer sides in spaced relation to the first pair of lengths of harder rubber and projecting inwardly a greater distance toward the mid plane of said frames.

3. A flexible chute comprising a series of rigid frames in substantially parallel spaced planes and having elongated openings formed therein, a pair of continuous lengths of rubber embedding said frames at the ends of said elongated openings, one of said lengths of rubber having a bead projecting inwardly therefrom to form a guide surface and pairs of lengths of rubber of greater hardness secured to said frames between the ends of said elongated openings and projecting inwardly to form guiding surfaces between said ends.

4. A chute for ammunition comprising a series of frames in substantially parallel spaced planes and comprising longer side elements and shorter end elements connecting said side elements to form an elongated opening conforming approximately to the ammunition to be conveyed, lengthwise strips of rubber embedded in and connecting said frames at their shorter end portions and spaced strips of rubber arranged in opposite sides of said opening and secured to the longer elements of said frame to form guides contacting the sides of ammunition passing through said chutes.

HENRY TREVASKIS.